May 6, 1941.    K. D. SMITH    2,240,866
VEHICLE TIRE
Filed April 28, 1937
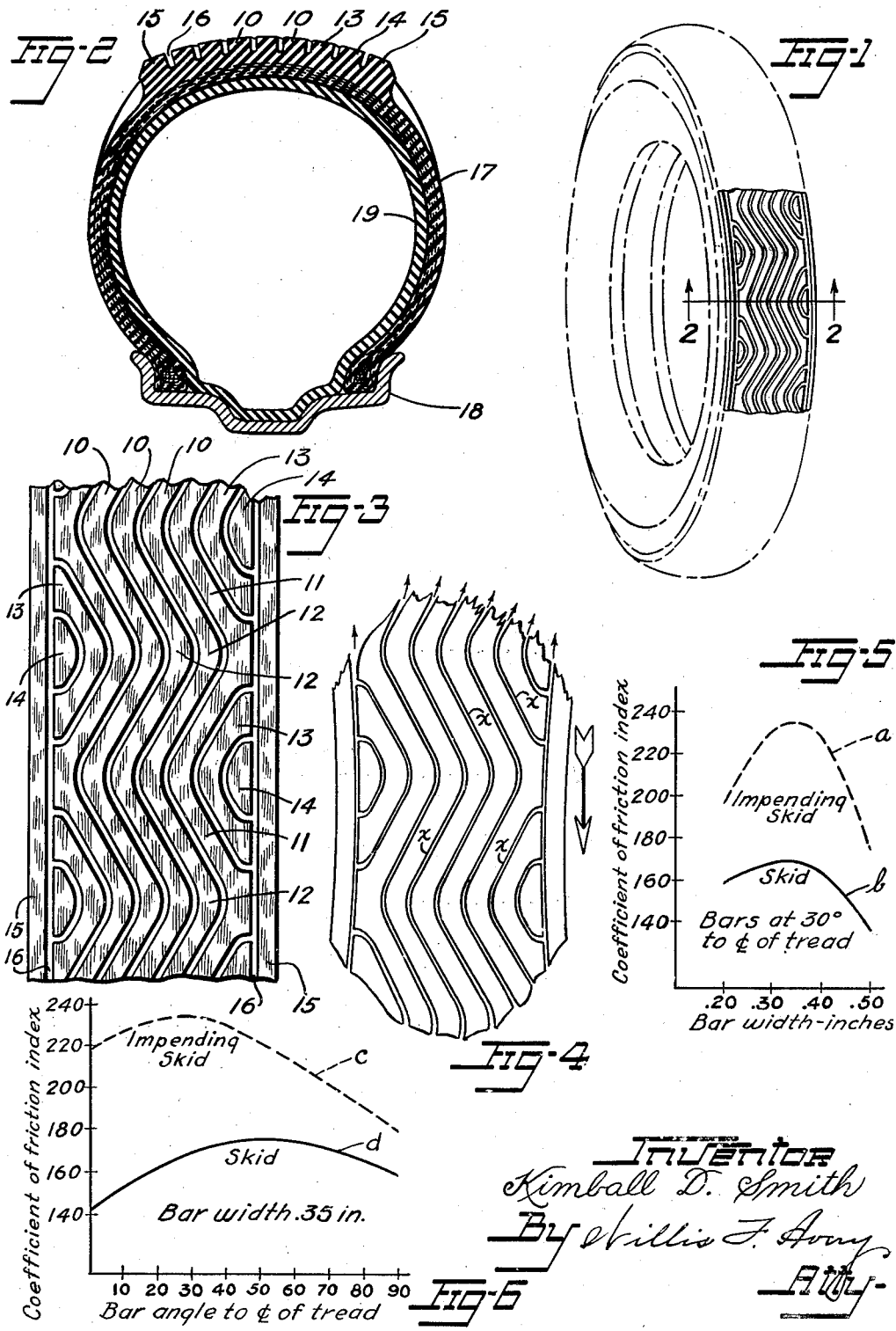

Patented May 6, 1941

2,240,866

UNITED STATES PATENT OFFICE 2,240,866

VEHICLE TIRE

Kimball D. Smith, Akron, Ohio, assignor to The
B. F. Goodrich Company, New York, N. Y., a
corporation of New York Application April 28, 1937, Serial No. 139,541

10 Claims. (Cl. 152—209)

This invention relates to vehicle tires and especially to the tread construction thereof.

With the use of smoother pavements and with the higher speeds of vehicles, the importance of the anti-skid properties of the tire tread on wet pavements has increased. Heretofore tire treads for the most part have been formed with a multitude of lugs or cornered ribs in an effort to provide skid-resistance, but these have not been entirely satisfactory for skid-resistance, and they have been objectionable also because of the noisy hum caused by the rapid slapping of the tread lugs upon the pavement. Smooth, unbroken treads have operated quietly, but their resistance to slipping has been objectionably low.

A result long-sought has been a tread construction that has a high resistance to skidding on wet pavements, and that is quiet in operation, and also durable for long-continued use and attractive in appearance. Tire constructions heretofore have not fully provided all these desired characteristics in the same tread.

The chief objects of the invention are to provide a tire tread construction having a very high degree of resistance to skidding on wet pavements; especially to provide a high degree of resistance against going into a skid when the brake is applied; and to provide for quickly stopping the slippage when the tire has gone into a skid; and further to provide for quietness in the operation of the tread on pavements. Other objects are to provide for good wear-resistance of the tread and attractiveness of its appearance.

These and further objects will be apparent from the following description, reference being had to the accompanying drawing, in which:

Fig. 1 is a perspective view, partly in full lines and partly in broken lines, of a tire having a tread constructed according to and embodying the invention in its preferred form.

Fig. 2 is a cross section of the tire, taken along the line 2—2 of Fig. 1, the tire being mounted upon a rim and inflated.

Fig. 3 is a developed plan view of the tire tread.

Fig. 4 is the outline of a "footprint" of the tread of the tire when loaded and stressed with a braking torque.

Figs. 5 and 6 are graphs of test results showing the critical effect on the coefficients of friction of changes in the angles and widths of tread bars.

If quietness of operation were the sole consideration, a tire tread of rubber composition having an entirely smooth face would be highly satisfactory, but the smooth tread has an exceedingly low resistance to skidding on a wet pavement. On a dry pavement the smooth tread effectively resists slipping because the coefficient of friction of the tread on the dry pavement is high.

To the end of providing a tread construction that most effectively resists slipping on a wet pavement, I have conducted extensive research involving tests of numerous forms of tread configuration, and I have found that the ability of a tread to resist slipping upon a wet pavement depends upon its effectiveness in making its way through the film of water to attain as nearly as possible the coefficient of friction of the tread on the pavement when dry. The low resistance to skidding of the smooth tread and of most prior configured treads results from their poor ability to wipe away the surface water and their resulting inability to increase the coefficient of friction to an adequate degree.

A twofold consideration is involved, that is, it is my aim to provide a tread having a very high coefficient of friction on the wet pavement while the rotating wheel has the brakes applied without locking, so that the likelihood of an actual skid is lessened, and also to provide a very high coefficient of friction when the wheel is locked and sliding on the wet pavement, because an actual skid is at times unavoidable and in such a case it is desired to lessen the extent of the skid as much as possible. The period during which the rotating wheel is braked without going into an actual skid by locking is referred to herein as the time of impending skid, and the period of movement of the locked wheel is referred to as the skid or actual skid.

Whereas some tread configurations proposed heretofore have had fairly good coefficients of friction during actual skid their coefficients of friction during the period of impending skid have been precariously low so that actual skids have resulted with undesirable ease. Also, prior tread constructions that have had fairly good coefficients of friction during the impending skid have not been entirely satisfactory when put into the actual skid.

As a result of studies and tests leading to the present invention I have found that skid-resistance superior to that of any prior tire tread construction of which I am aware can be provided by diagonally disposed bars of the tread when they are arranged and dimensioned in a certain manner, as will be explained more fully hereinafter. The invention includes the discovery among other things, that the highest degree of skid-resistance of the tread bars is critically dependent upon the width of the individual bars and their angle of disposition with relation to the longitudinal axis of the tread.

The critical nature of the width and angles of the obliquely disposed bars in their effect on skid-resistance is illustrated in the graphs of Figs. 5 and 6. In Fig. 5, coefficient of friction indices, indicative of skid-resistance, are plotted as ordinates against bar widths in inches as abscissae, for bars that are straight, rectangular in cross section and disposed across the tread at an angle of 30° to the center line of the tread. The bar width referred to is the width of the individual bar in the direction normal to the edge of the bar. The upper curve (a) shows the effect on the coefficient of friction index for the impending skid of changing the width of the bars. It will be seen that the coefficient of friction index is high for bar widths of between about .25 and about .45 inch and that the curve drops off rapidly on each side of this range. The best results are obtained with a bar width between about .30 and .40 inch, and peak results are obtained at a bar width of about .35 to .375 inch. Curve (b) shows the corresponding coefficient of friction indices for actual skid and it will be seen that the high part and peak of this curve occur at virtually the same bar widths as the peak of curve (a).

Fig. 6 shows the effect on the coefficient of friction indices of varying the bar angle for a bar width of .35 inch. Curve (c), for impending skid, shows that maximum coefficient of friction is obtained with the bars at an angle of about 30° to the longitudinal axis of the tread. Curve (d) for actual skid shows that the maximum coefficient of friction is obtained at a somewhat larger angle, but the best results for both impending skid and actual skid are obtained in the range of about 30° to about 40°, although good results may be obtained for bar angles of from about 20° to about 50°. Inasmuch as the peak of the impending skid curve is obtained with an angle of the bars of about 30°, and this angle does not lie far below the peak of the skid curve, which is of lesser slope, I prefer to provide bars at an angle of about 30° for good combined results.

The coefficient of friction "index" referred to is a convenient manner of indicating the value of the coefficient of friction of a tread under consideration as compared with the coefficient of friction of a smooth, unbroken tread tested for its coefficient of friction under the same conditions. The coefficient of friction of both the tread under consideration and the smooth tread are determined and the ratio of the former to the latter, multiplied by 100 to remove the decimals, gives the index figure. Thus, an index figure of, say, 200 for a particular tread shows that it has a coefficient of friction twice as great as that of the smooth tread. Test data for both the impending skid and the actual skid were taken to provide the curves (a), (b), (c), and (d).

For determining the coefficient of friction for this purpose the tires were tested on a substantially level pavement of monolithic repressed brick grouted with asphalt, which is noted for its slipperiness when wet. For uniformity and accuracy of results the wetting of the pavement was effected by a sprinkler system in advance of the test tire. The tire was mounted on a towed trailer of known weight through a continuously registering dynamometer which indicated the drawbar pull at all times during the free running of the wheel and during all conditions of braking, including the period of impending skid and also actual skid. From the values thus obtained, properly averaged for different speeds the directions of travel on the road, the coefficient of friction indices were ascertained.

Referring now to Figs. 1 to 4, the improved tire tread construction, which may be of any suitable rubber composition employed for tire treads, comprises a series of bars 10, 10 of a width preferably within the range of about .30 to about .40 inch and having extensive reaches of the bars extending diagonally at an angle to the center line of the tread, preferably in the range of about 30° to about 40° to produce a high degree of skid-resistance. The superior skid-resisting qualities of the improved tread results to a large degree from the ability of the bars to wipe the water from the surface of the pavement at the leading edges of the bars so that the rubber surfaces of the bars rearwardly of the wiping edges can effectively come in contact with the pavement with a resulting increase in the coefficient of friction to a value more nearly that of the tread on the dry pavement. As shown by the graphs of Figs. 5 and 6, the tire is most effective for accomplishing these results when the bars are of a width and an angle to the center line of the tread within the critical ranges heretofore discussed.

I have found that the best results are obtained by providing a groove width between adjacent bars of between about .09 and about .11 inch, although good results may be obtained in the range of about .05 to about .15 inch. With such spacing the ribs are not so close together as to restrict objectionably the passage of water through the grooves or interfere with the action of each other in wiping away water, and on the other hand the bars are not so widely spaced as to detract objectionably from the pavement-contacting surfaces of the tread bars or the linear extent of the bars, especially at their wiping edges. The depth of the grooves as originally provided may be varied considerably but I prefer to mold the tread with a groove depth of about three times the groove width, and to provide all the grooves of the tread of substantially uniform depth.

The bars 10, 10 disposed centrally of the tread are preferably made circumferentially continuous in a sinuous manner with extensive straight and oblique reaches 11, 11 joined preferably by curved junctures 12, 12. Auxiliary bars 13, 13 and 14, 14 of substantially the same width as the bars 10, 10 are provided with separating grooves between the bars of substantially uniform width and depth throughout substantially the same in dimensions as the grooves between the bars 10, 10. The curved form of the rib junctures is preferred because of advantages in facilitating flow of water and also in appearance, but junctures of less curvature or even angular corners may be provided, if desired.

At the side margins or shoulders of the ground-contacting face of the tread are provided a pair of continuous, straight longitudinally extending bars 15, 15 of uniform width, preferably about the same as the width of the bars 10, 10, and separated from the intermediate portion of the tread face by a pair of circumferentially continuous grooves 16, 16 which serve to conduct water at the sides of the tread bars rearwardly in an effective manner, so as to remove water despite the fact that the water cannot flow outwardly from the tread laterally thereof. This construction provides for quietness of operation of the tire inasmuch as there are no breaks at the tread shoulder to cause slapping of lug-edges on the pavement, and the quietness is obtained without however lessening objectionably the skid-resisting qualities of the tread, and provision is made for passage of water rearwardly from the ground-contacting portion of the tread so that water will not be dammed up excessively by obstructions in the tread configuration and thereby lessen skid-resistance objectionably.

The disposition of the long straight reaches of the oblique bars 18, 19 predominately at the center portion of the tread makes for effective skid-resistance, this being the portion of the tread that is the first to contact and the last to leave the pavement, as will be seen from the laterally curved form of the tread face in the inflated shape of the tire as it is shown most clearly in Fig. 2. In that figure the improved tread is shown as a part of a conventional tire body 17 mounted upon a rim 18 and held inflated by an inner tube 19.

Referring to Fig. 4, which shows a "print" of a loaded tire when moving in the direction of the large arrow and with the brake applied, the construction is such that all the grooves remain open for passage of water although there is a slight closing of the grooves and lateral narrowing of the tread as a result of the pressure upon it. At the leading edges of the bars the water is wiped from the pavement and is conducted rearwardly through the grooves so that the surfaces of the tread rubber are effective to produce a high coefficient of friction against the pavement to slow down and stop the car during the period of impending skid, and also during the period of actual skid, if the skid is unavoidable, as because of excessive speed. The numerous exits for the passage of the water rearwardly of the ground-contacting portion of the tread face are indicated by the arrows at the top of Fig. 4. It will be noted that at these exits of the grooves at the rearward part of the ground-contacting portion of the tread, the grooves are automatically somewhat widened temporarily as a result of the distortion of the moving tread, which facilitates the free exit of the water.

The invention in its preferred embodiment has advantages also from the standpoint of wear-resistance especially in that the preferred construction does not have any sharp corners at the margin of the tread or elsewhere which might be broken and chipped off or worn down easily and unevenly by a lack of sturdiness. It will be noted that in the whole tread construction no acute-angled corner exists, all corners being of 90° or greater which makes for ruggedness of the construction, as well as quietness of operation. In addition to providing superior skid-resistance on wet pavements, both during impending skid and during an actual skid, materially better, I believe, than in any tire produced heretofore, the improved tread is quiet in operation, highly resistant to wear and breakdown of its tread, and attractive in appearance.

I claim:

1. A tire comprising a tread having in the face thereof a plurality of bars having reaches thereof of a width between about .30 and .40 inch and extending across the tread at an angle between about 20° and 50° to the longitudinal axis of the tread, the grooves separating the bars being of substantially uniform width of between about .08 and about .12 inch.

2. A tire comprising a tread having in the face thereof a pair of longitudinally extending, continuous straight bars at the margins of the tread face, and disposed between the marginal bars and separated therefrom by circumferentially continuous grooves, a plurality of bars each of a width between about .25 and about .45 inch and having extensive reaches thereof extending at an angle of between about 20° and about 50° to the longitudinal axis of the tread.

3. A tire comprising a tread having in the face thereof a pair of longitudinally extending, continuous straight bars of uniform width at the margins of the tread face and, disposed between the marginal bars and separated therefrom by circumferentially continuous grooves, a plurality of bars having extensive straight reaches thereof of a width between about .30 and .40 inch and extending at an angle of about 30° to the longitudinal axis of the tread.

4. A tire comprising a tread having in the face thereof a pair of longitudinally extending, continuous straight bars of uniform width at the margins of the tread face and, disposed between the marginal bars and separated therefrom by circumferentially continuous grooves, a plurality of circumferentially continuous, sinuous bars each of a width between about .30 and about .40 inch and having extensive reaches thereof extending at an angle of about 30° to the longitudinal axis of the tread.

5. A tire comprising a tread having in the face thereof a pair of longitudinally extending, continuous straight bars at the margins of the tread face, and, disposed between the marginal bars and separated therefrom by circumferentially continuous grooves, a plurality of sinuous, circumferentially continuous bars each of a width between about .25 and .45 inch and having extensive reaches thereof disposed at an angle of between about 20° and 50° to the longitudinal axis of the tread.

6. A pneumatic tire having a tread comprising in its face a plurality of bars having extensive straight reaches thereof extending obliquely across the tread face at an angle of between about 20° and about 50° to the longitudinal axis of the tread and being between about .25 inch and about .45 inch in width, and longitudinally extending continuous bars at the margins of the tread face, all the bars being separated by continuously open grooves of between about .05 inch and about .15 inch in width.

7. A pneumatic tire having a tread comprising in its face a plurality of bars having extensive straight reaches thereof extending obliquely across the tread face at an angle of between about 20° and about 50° to the longitudinal axis of the tread and being between about .25 inch and about .45 inch in width, and longitudinally extending continuous bars at the margins of the tread face, all the bars being separated by continuously open grooves between about .05 inch and about .15 inch in width and all the corners of the bars in the tread face being at least 90°.

8. A pneumatic tire having a tread of rubber composition comprising in its face a plurality of circumferentialy continuous, sinuous bars having extensive straight reaches thereof extending at an angle of about 30° to the longitudinal axis of the tread, a pair of circumferentially continuous, straight bars of uniform width at the margins of the tread face, and a plurality of discontinuous bars disposed between the marginal bars and the sinuous bars, all said bars being of substantially uniform width between about .30 and .40 inch, and all the bars being separated from one another by grooves of a width between about .08 and about .12 inch.

9. A vehicle tire comprising a tread having in the face thereof a plurality of circumferentially continuous, sinuous bars having extensive reaches thereof extending at an angle of between about 20° and about 50° to the longitudinal axis of the tread, said reaches of the bars being of substantially uniform width between about .25 and about .45 inch, and a pair of circumferentially continuous substantially non-devious bars at the margins of the tread face separated from the sinuous bars by continuously open grooves.

10. A vehicle tire comprising a tread having in the face thereof a plurality of circumferentially continuous sinuous bars having extensive reaches thereof extending at an angle of between about 20° and about 50° to the longitudinal axis of the tread, said reaches of the bars being of substantially uniform width between about .25 and about .45 inch, a pair of circumferentially continuous substantially non-devious bars at the margins of the tread face, and a plurality of discontinuous elements disposed between the sinuous bars and the marginal bars, the marginal bars being separated from the sinuous bars and the discontinuous bars by continuously open grooves.

KIMBALL D. SMITH.